United States Patent
Ishihara

(10) Patent No.: US 9,934,582 B2
(45) Date of Patent: Apr. 3, 2018

(54) IMAGE PROCESSING APPARATUS WHICH IDENTIFIES CHARACTERISTIC TIME POINTS FROM VARIATIONS OF PIXEL VALUES IN IMAGES, IMAGE PROCESSING METHOD, AND RECORDING MEDIUM

(71) Applicant: CASIO COMPUTER CO., LTD., Shibuya-ku, Tokyo (JP)

(72) Inventor: Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/856,313

(22) Filed: Sep. 16, 2015

(65) Prior Publication Data

US 2016/0086347 A1 Mar. 24, 2016

(30) Foreign Application Priority Data

Sep. 22, 2014 (JP) ................................. 2014-193160

(51) Int. Cl.
*G06T 7/20* (2017.01)
*H04N 5/232* (2006.01)
*G06T 7/246* (2017.01)

(52) U.S. Cl.
CPC ............ *G06T 7/2033* (2013.01); *G06T 7/246* (2017.01); *H04N 5/23222* (2013.01); *H04N 5/23229* (2013.01); *H04N 5/23293* (2013.01); *G06T 2207/10016* (2013.01)

(58) Field of Classification Search
CPC ................. G06T 7/2033; G06T 7/2006; G06T 2207/10016; G06T 2207/10004; G06T 2207/20148; G06T 2207/30224; H04N 5/23229; G06K 9/00724; G06K 7/00342
USPC ...................................... 348/207.1
See application file for complete search history.

(56) References Cited

U.S. PATENT DOCUMENTS

| | | | | |
|---|---|---|---|---|
| 5,416,522 A | * | 5/1995 | Igarashi | H04N 5/145 348/699 |
| 8,977,109 B2 | * | 3/2015 | Barcons-Palau | G06K 9/00335 386/278 |
| 8,982,216 B2 | * | 3/2015 | Ishii | H04N 5/262 348/157 |
| 9,299,158 B2 | * | 3/2016 | Hanish | G06T 7/246 |
| 9,457,228 B2 | * | 10/2016 | Sinha | H04N 5/772 |

(Continued)

FOREIGN PATENT DOCUMENTS

| | | |
|---|---|---|
| JP | 2011030669 A | 2/2011 |
| JP | 2015069432 A | 4/2015 |

*Primary Examiner* — Pritham Prabhakher
(74) *Attorney, Agent, or Firm* — Holtz, Holtz & Volek PC

(57) ABSTRACT

An image capture apparatus capable of identifying desired time points without using a special device is provided. The image capture apparatus 1 includes a moving image acquiring unit 53, a calculating unit 56, and an identification area analyzing unit 57. The moving image acquiring unit 53 acquires a plurality of images captured consecutively. The calculating unit 56 calculates variation values of pixel values along a time series of the plurality of images acquired by the moving image acquiring unit 53, within a predetermined region common to the plurality of images. The identification area analyzing unit 57 identifies two time points according to a predetermined standard from among a plurality of time points in the time series, on the basis of the variation values of the pixel values calculated by the calculating unit 56.

20 Claims, 6 Drawing Sheets

(56) References Cited

U.S. PATENT DOCUMENTS

| | | | |
|---|---|---|---|
| 2006/0281060 A1* | 12/2006 | Katayama | A63B 24/0003 434/247 |
| 2009/0042661 A1* | 2/2009 | Cheng | A63B 24/0003 473/266 |
| 2009/0263023 A1* | 10/2009 | Iwamoto | H04N 5/147 382/199 |
| 2011/0122154 A1* | 5/2011 | Kawai | G11B 27/034 345/629 |
| 2011/0275045 A1* | 11/2011 | Bhupathi | G09B 19/003 434/247 |
| 2012/0050529 A1* | 3/2012 | Bentley | G01S 19/19 348/139 |
| 2012/0105657 A1* | 5/2012 | Yokohata | H04N 5/2257 348/208.4 |
| 2013/0178304 A1* | 7/2013 | Chan | A63B 69/36 473/266 |
| 2014/0003666 A1* | 1/2014 | Park | G09B 19/0038 382/103 |
| 2015/0007658 A1* | 1/2015 | Ishikawa | G01P 13/00 73/514.35 |
| 2015/0018111 A1* | 1/2015 | Nadkarni | A63B 69/3632 473/223 |
| 2015/0092995 A1 | 4/2015 | Ishihara | |
| 2015/0146918 A1* | 5/2015 | Lin | H04N 7/18 382/103 |

\* cited by examiner

IMAGE PROCESSING APPARATUS WHICH IDENTIFIES CHARACTERISTIC TIME POINTS FROM VARIATIONS OF PIXEL VALUES IN IMAGES, IMAGE PROCESSING METHOD, AND RECORDING MEDIUM

CROSS-REFERENCE TO RELATED APPLICATIONS

This application is based upon and claims the benefit of priority under 35 USC 119 of Japanese Patent Application No. 2014-193160 filed on Sep. 22, 2014, the entire disclosure of which, including the description, claims, drawings, and abstract, is incorporated herein by reference in its entirety.

BACKGROUND OF THE INVENTION

1. Field of the Invention

The present invention relates to an image processing apparatus which identifies characteristic time points from variations of pixel values in a plurality of images, an image processing method, and a recording medium.

2. Description of the Related Art

An apparatus which identifies an image at the moment of impact from moving image data obtained by photographing a subject who is taking a sequence of swing motion has conventionally been known, as described in Japanese Patent Application Laid-Open No. 2011-030669.

SUMMARY OF THE INVENTION

An image processing apparatus of the present invention includes: an acquiring unit configured to acquire a plurality of images captured consecutively; a first calculating unit configured to calculate variation values of pixel values along a time series of the plurality of images acquired by the acquiring unit, in a position common to the plurality of images; and a first identifying unit configured to identify two time points according to a predetermined standard from among a plurality of time points in the time series, on the basis of the variation values of the pixel values.

An image processing method of the present invention includes: acquiring a plurality of images captured consecutively; calculating variation values of pixel values along a time series of the plurality of images acquired in the acquiring step, in a position common to the plurality of images; and identifying two time points according to a predetermined standard from among a plurality of time points in the time series, on the basis of the variation values of the pixel values.

A non-transitory recording medium of the present invention has a computer-readable program recorded therein, the program causing a computer to carry out functions as: an acquiring unit configured to acquire a plurality of images captured consecutively; a first calculating unit configured to calculate variation values of pixel values along a time series of the plurality of images acquired by the acquiring unit, in a position common to the plurality of images; and a first identifying unit configured to identify two time points according to a predetermined standard from among a plurality of time points in the time series, on the basis of the variation values of the pixel values.

DETAILED DESCRIPTION OF THE INVENTION

An embodiment of the present invention will be described below with reference to the drawings.

Figure 1:
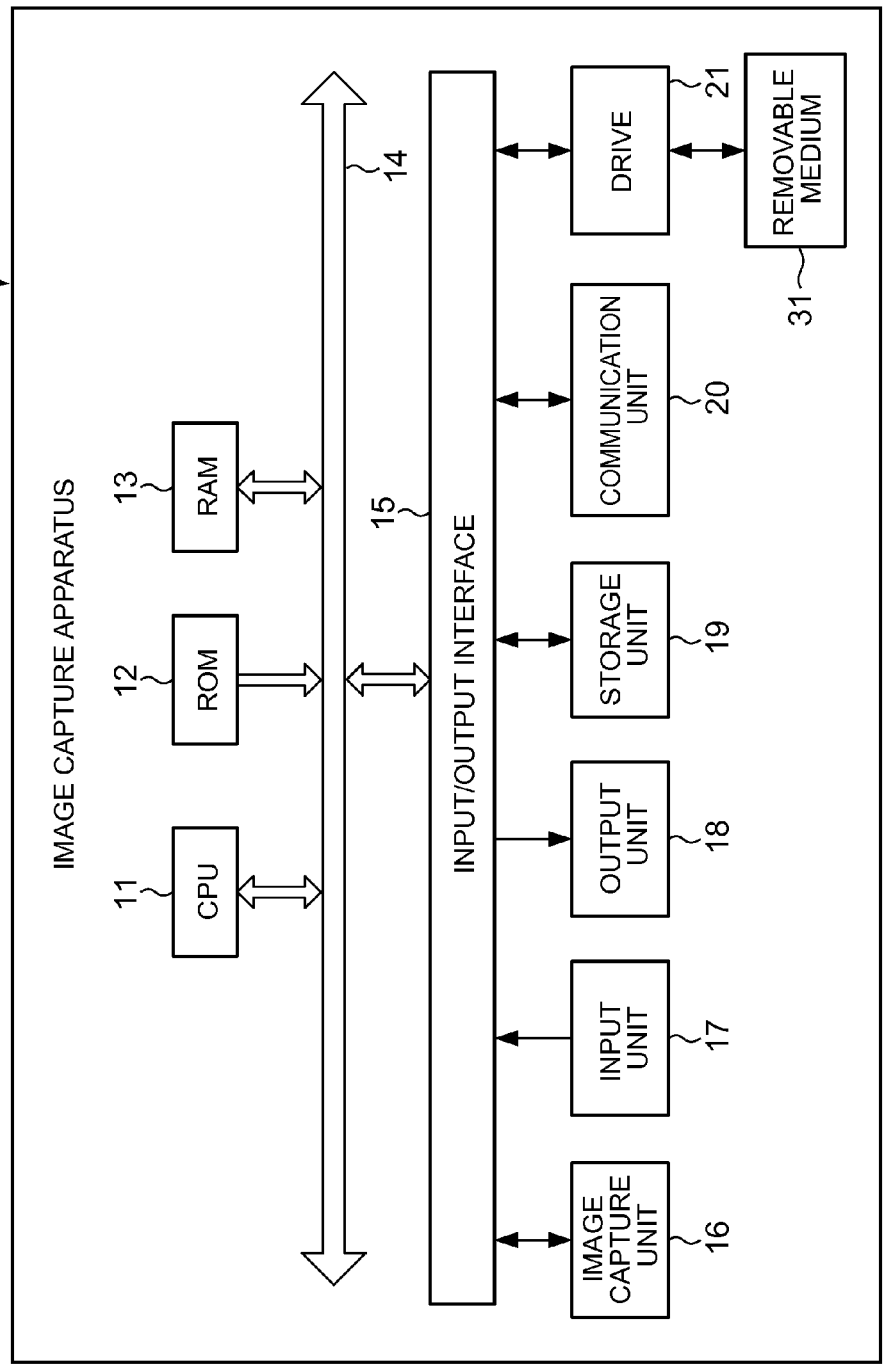
FIG. 1 is a block diagram showing the hardware configuration of an image capture apparatus according to an embodiment of an image processing apparatus of the present invention.

FIG. 1 is a block diagram showing the hardware configuration of an image capture apparatus according to an embodiment of the image processing apparatus of the present invention.

The image capture apparatus 1 is configured as, for example, a digital camera.

The image capture apparatus 1 includes a central processing unit (CPU) 11, a read only memory (ROM) 12, a random access memory (RAM) 13, a bus 14, an input/output interface 15, an image capture unit 16, an input unit 17, an output unit 18, a storage unit 19, a communication unit 20, and a drive 21.

The CPU 11 executes various processing in accordance with a program stored in the ROM 12, or a program loaded to the RAM 13 from the storage unit 19.

The RAM 13 also stores data necessary for the CPU 11 to execute the various processing, as appropriate.

The CPU 11, the ROM 12, and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown in the figure.

The optical lens unit is made up of lenses, such as a focus lens and a zoom lens, which collect light for photographing a subject.

The focus lens is a lens for forming an image of a subject on a light receiving surface of an image sensor. The zoom lens is a lens having a focal length variable freely within a certain range.

The optical lens unit also includes a peripheral circuit for adjusting focus, exposure, white balance, and other setting parameter, as necessary.

The image sensor is made up of a photoelectric conversion element, an analog front end (AFE), and so on.

The photoelectric conversion element may be, for example, a complementary metal oxide semiconductor (CMOS) type photoelectric conversion element. The photoelectric conversion element receives an image of a subject incident from the optical lens unit. The photoelectric conversion element photoelectrically converts (or, captures) the image of the subject and accumulates image signals for a predetermined time, and sequentially supplies the accumulated image signals, as analog signals, to the AFE.

The AFE carries out a variety of signal processing, such as analog-to-digital (A/D) conversion, on the analog image signals. Through the signal processing, digital signals are generated, which are output as output signals from the image capture unit 16.

These output signals from the image capture unit 16 will be hereinafter called "data of a captured image". The data of a captured image is supplied to the CPU 11 etc. as appropriate.

The input unit 17 includes various buttons and the like, and inputs various kinds of information in accordance with instruction operations by a user.

The output unit 18 includes a display, a speaker, and the like, and outputs images and sound.

The storage unit 19 includes a hard disk or a dynamic random access memory (DRAM), and stores data of various images.

The communication unit 20 controls communication with other devices (not shown) via networks including the Internet.

The drive 21 is mounted with a removable medium 31 as appropriate. The removable medium 31 may be a magnetic disk, an optical disk, a magneto-optical disk, or a semiconductor memory.

The program read from the removable medium 31 by the drive 21 is installed to the storage unit 19 as necessary.

Various data such as the data of images stored in the storage unit 19 may also be stored in the removable medium 31, similarly as in the storage unit 19.

The image capture apparatus 1 configured as described above has the functions capable of analyzing a moving image including a motion (in the present embodiment, golf swing) of a subject and generating a moving image (in the present embodiment, a swing moving image) over a predetermined period of motion (in the present embodiment, over a period from the start position of the swing to the impact position).

Figure 2A:
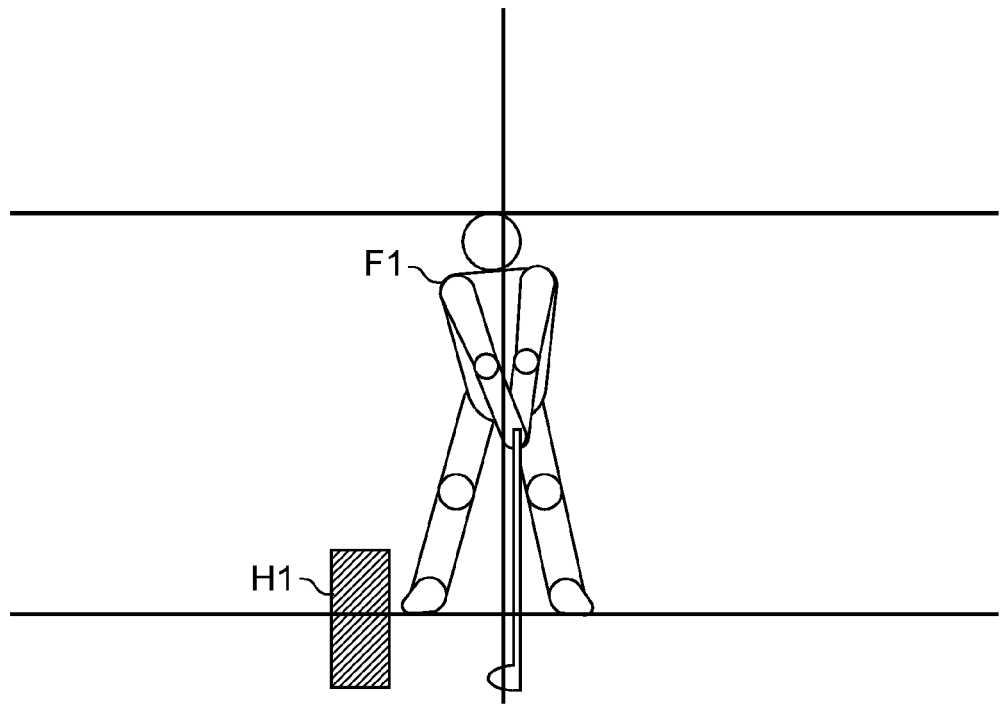
FIG. 2A is a schematic diagram illustrating the way of identifying the motion of a subject in the present embodiment.
Figure 2B:
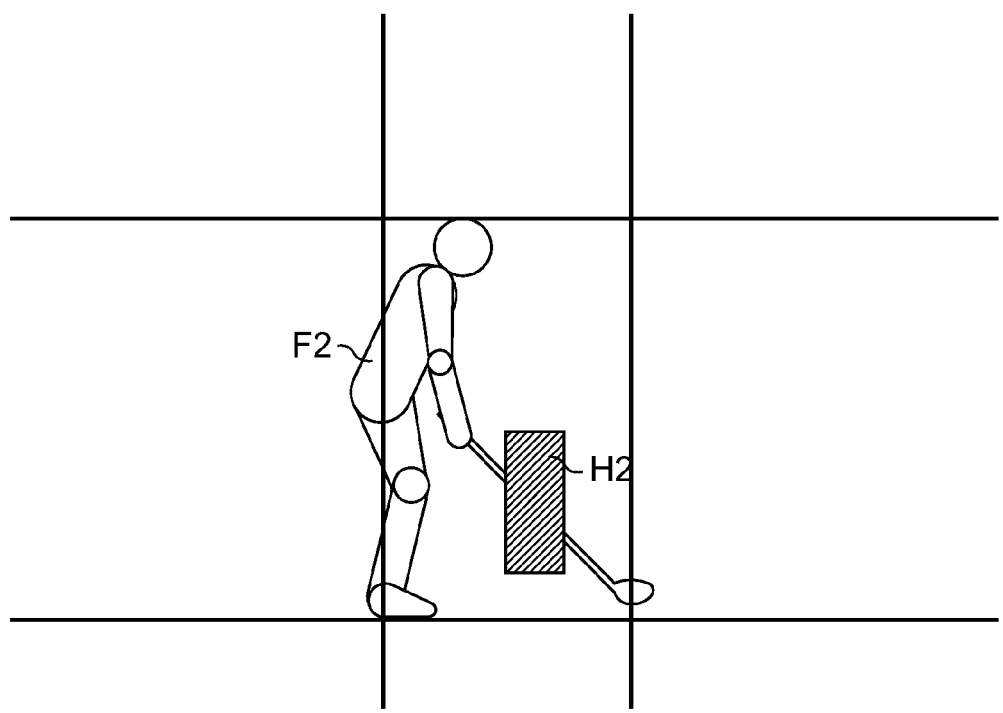
FIG. 2B is another schematic diagram illustrating the way of identifying the motion of a subject in the present embodiment.

FIGS. 2A and 2B are schematic diagrams illustrating the way of identifying the motion of a subject in the present embodiment. FIG. 2A illustrates the case of photographing a subject who is taking a swing, from the front. FIG. 2B illustrates the case of photographing the subject who is taking a swing, from the rear.

In the present embodiment, as shown in FIGS. 2A and 2B, regions (hereinafter, referred to as "identification areas") H1, H2 for identifying the time point immediately after the start of the golf swing and the time point immediately before the impact in the moving image data are provided in the positions where the golf club (more specifically, the head of the golf club) passes after the start of the swing and before the impact.

It is necessary to take into account that, in the golf swing, the swing becomes a back-and-forth motion during the period from the time point corresponding to the swing start position (address position) to the time point corresponding to the impact position.

Setting the identification areas H1, H2 between the start position and the impact position in the moving image data frames to be processed ensures that opportunities for identification can be obtained two times in total, immediately after the start of the swing of the golf club and immediately before the impact, in each identification area H1, H2.

With this configuration, the chances of erroneous identification can be reduced as compared to the technique where only one time of the moment of impact is identified.

Processing for identifying a frame image data item in which a golf club is present in an identification area will now be described.

To identify a frame image data item with the golf club present in the identification area, frame image data items adjacent to each other in a plurality of frame image data items constituting moving image data are compared to identify the changes in pixel values between a frame image data item in the state where there is no golf club in the identification area and a frame image data item in the state where there is a golf club in the identification area.

Specifically, in the case where the total sum of difference values of the pixel values between the identification areas in the adjacent frame image data items is a threshold value or more, then it can be estimated that there is the golf club in the identification area in the frame image data item corresponding to the time point when the total sum has become the threshold value or more.

More specifically, in the present embodiment, in the case where the sum of squared differences (SSD) (hereinafter, referred to as an "evaluation value") as the difference values of the pixel values, i.e. luminance values, in the identification areas is a threshold value or more, the frame image data item corresponding to the time point when the evaluation value has become the threshold value or more is estimated as a candidate for the frame image data item with the golf club present in the identification area.

It should be noted that, in the present embodiment, the threshold value is determined on the basis of an average value, over a predetermined period, of the difference values calculated in the state where there is no golf club in the identification area.

Figure 3:
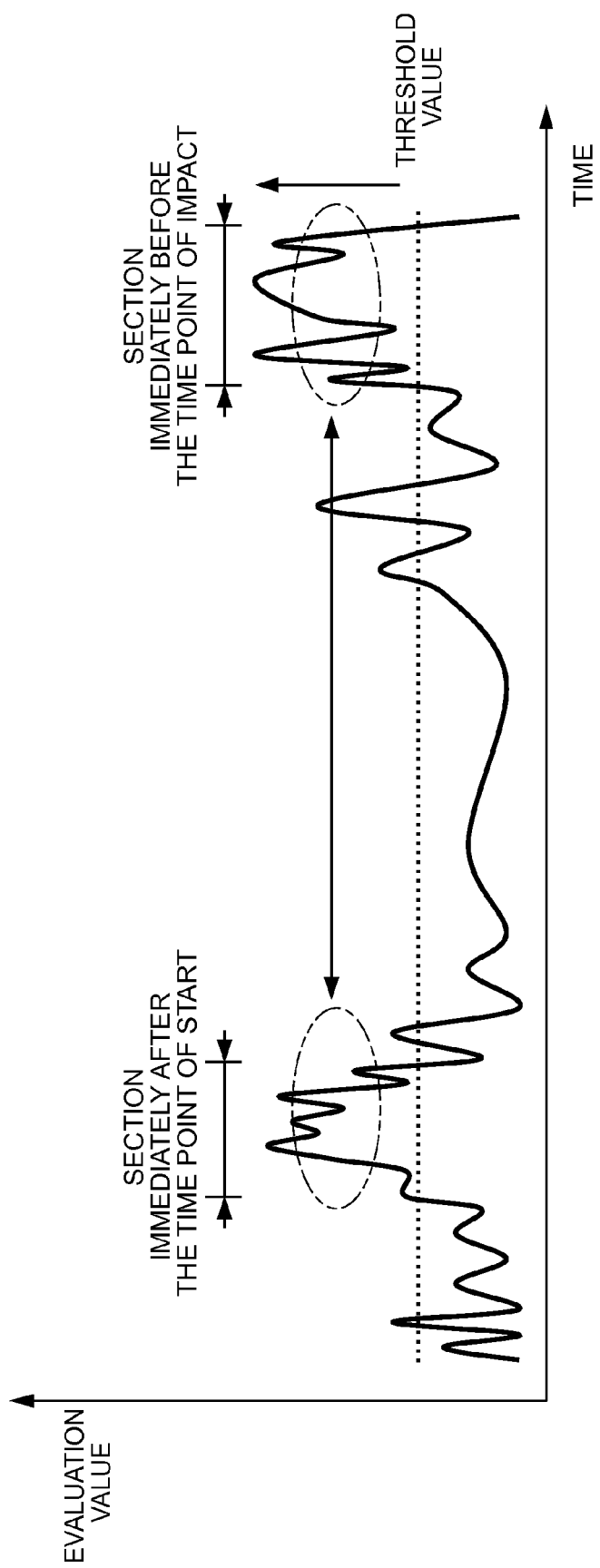
FIG. 3 is a graph showing the transition in time series of an evaluation value from around the start position to around the impact position.

FIG. 3 is a graph showing the transition in time series of the evaluation value from around the start position to around the impact position.

Generally, when an identification area is provided between the start position and the impact position within a shooting range, there are a plurality of periods (hereinafter, referred to as "sections") each extending from the time point when the evaluation value between the adjacent frame image data items has become the threshold value or more to the time point immediately before the evaluation value becomes less than the threshold value, due to the noise occurring in the images, as shown in FIG. 3, from around the start position of the golf swing to around the impact position.

In the present embodiment, the identification area is set between around the swing start position to around the impact position.

Thus, two sections identified from among the plurality of sections should correspond respectively to the section immediately after the start position and the section immediately before the impact position.

Therefore, when a group of frame image data items between the frame image data items corresponding to around the start position and the frame image data items corresponding to around the impact position, including frame image data items for a predetermined time ahead of the time point representing the earlier one of the identified two sections (for example, the time point at which the evaluation value is highest in the earlier section) and frame image data items for a predetermined time following the time point representing the later section (for example, the time point at which the evaluation value is highest in the later section), is extracted as desired moving image data, then the frame image data items corresponding respectively to the start position and the impact position will be included in the desired moving image data.

It should be noted that the time point representing the section immediately after the start position and the time point representing the section immediately before the impact position are not limited to the time points having the highest evaluation values in the respective sections. The time point representing a section may be the center point in that section, or may be the time point at the beginning or at the end of that section.

More specifically, in order to identify the time point around the start position and the time point around the impact position in the present embodiment, the evaluation values in a section from the time point when it has become a threshold value or more to the time point immediately before it becomes less than the threshold value are integrated to obtain an integrated value which corresponds to the area of that section.

Then, from among a plurality of sections, two sections having the first and second largest integrated values, each having a width within a predetermined range, and each having the integrated value falling within a predetermined range are identified.

Further, in the case where the period between the time points representing the sections having the first and second largest integrated values (for example, the period from the time point at which the evaluation value is highest in the first section to the time point at which the evaluation value is highest in the second section) is within a predetermined period, then the frame image data item corresponding to the time point at which the evaluation value is highest in the first one of the identified two sections is determined to be the frame image data item corresponding to the time point immediately after the start position.

Further, the frame image data item corresponding to the time point at which the evaluation value is highest in the second section is determined to be the frame image data item corresponding to the time point immediately before the impact position.

In this manner, in the present embodiment, moving image data is generated, with respect to the frame image data item immediately after the start position and the frame image data item immediately before the impact position, by extracting frame image data items from the one a predetermined time ahead of the frame image data item immediately after the start position to the one a predetermined time after the frame image data item immediately before the impact position.

As a result, swing moving image data with the swing captured from the start position to the impact position is generated.

It should be noted that, in the present embodiment, the moving image data from which the swing moving image data is to be extracted is subjected to a decoding process in units of several frames.

While the decoding process is performed, the process of identifying the time points corresponding respectively to the point immediately after the start position and the point immediately before the impact position is performed as well.

Hereinafter, the frame image of the moving image data that has undergone the decoding process will also be called the "decoded image".

Figure 4:
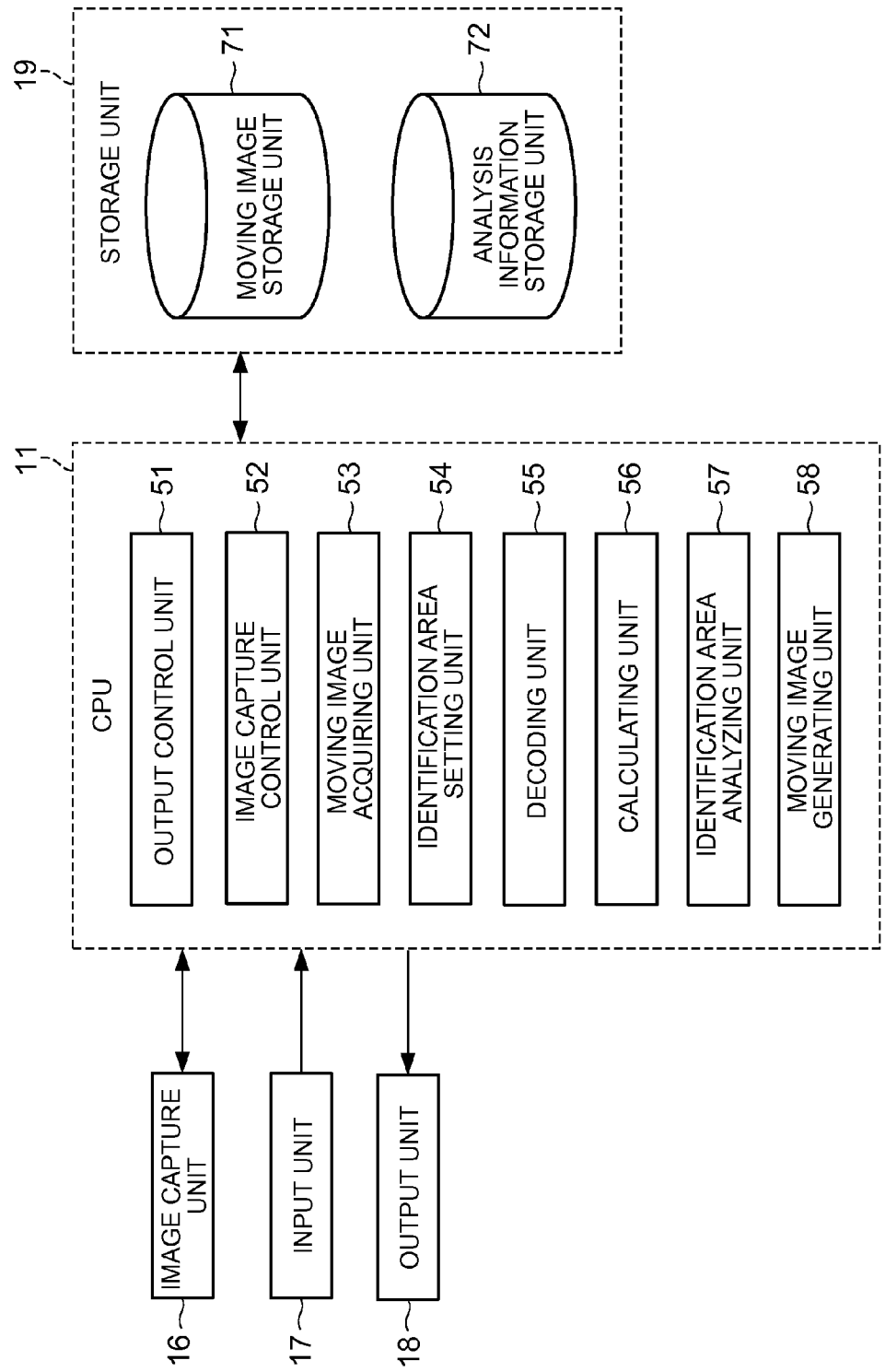
FIG. 4 is a functional block diagram showing the functional configuration for executing a moving image photographing process and a swing moving image generating process, among the functional configurations of the image capture apparatus in FIG. 1.

FIG. 4 is a functional block diagram showing the functional configuration for carrying out a moving image photographing process and a swing moving image generating process, among the functional configurations of the image capture apparatus 1 described above.

The "moving image photographing process" refers to a series of processing of photographing moving image data from which swing moving image data is to be extracted in the swing moving image generating process.

The "swing moving image generating process" refers to a series of processing of extracting moving image data with respect to the decoded images corresponding to the time point around the swing start position and the time point around the impact position, respectively, identified as a result of analysis of the moving image, and generating swing moving image data including the frame image data items at the time points corresponding to the start position and the impact position, respectively.

In the image capture apparatus 1, first, moving image data from which swing moving image data is to be extracted is photographed in the moving image photographing process, and then, the swing moving image generating process is carried out to generate the swing moving image data from the moving image data as the extraction target.

In the case of carrying out the moving image photographing process, as shown in FIG. 4, an output control unit 51, an image capture control unit 52, and a moving image acquiring unit 53 operate in the CPU 11.

A moving image storage unit 71 and an analysis information storage unit 72 are set in part of the storage unit 19.

The moving image storage unit 71 stores moving image data acquired from the image capture unit 16.

The analysis information storage unit 72 stores a guide (hereinafter, referred to as a "photographing guide") for the sake of positioning a subject at the time of shooting so as to obtain a moving image suitable for generation of a swing moving image, and also stores information on integrated values (described later), peak evaluation values (described later), and time slots of sections (described later), for use in identifying the candidates for the time points corresponding to the start position and the impact position.

As the photographing guide, for example, a transparent human form F1, F2, mimicking the posture at the start position as shown in FIG. 2A or 2B, and the identification area H1, H2 are displayed on a live view image.

It should be noted that the photographing guide may be configured such that the human form alone is displayed, with no identification area displayed, or that the identification area alone is displayed.

The output control unit 51 controls the output unit 18 to display a live view image and also, on the live view image, one or more photographing guides (see FIGS. 2A and 2B) stored in the analysis information storage unit 72.

As a result, the live view image is displayed on the output unit 18, and the photographing guides are also displayed on the live view image.

A user determines the photographing position such that the subject being displayed on the live view image is overlaid on the human form as the photographing guide.

The image capture control unit 52 controls the image capture unit 16 to perform an image capture process.

As a result of the image capture process, frame image data items are sequentially output from the image capture unit 16, and the frame image data items output are turned into moving image data by predetermined compression processing, so that a piece of moving image data is output.

The moving image acquiring unit 53 acquires the moving image output from the image capture unit 16. The acquired moving image data is stored in the moving image storage unit 71.

In the case of carrying out the swing moving image generating process, as shown in FIG. 4, the moving image acquiring unit 53, an identification area setting unit 54, a decoding unit 55, a calculating unit 56, an identification area analyzing unit 57, and a moving image generating unit 58 operate in the CPU 11.

Further, the moving image storage unit 71 and the analysis information storage unit 72 are set in part of the storage unit 19.

In the moving image storage unit 71, swing moving image data generated is stored.

In the analysis information storage unit 72, for example, the information regarding the identification area (hereinafter, referred to as "identification area information") and the integrated values calculated, such as the information concerning the analysis of the moving image data are stored The information regarding the identification area includes: information on the setting position of the identification area in the moving image data, and information regarding the position and shape of the identification area that change in accordance with "best shot (BS) scenes" for setting photographing conditions in specific photographing scenes, "left-handed setting" for the case where a subject whose swing moving image data is to be generated is a left-handed person, and the rotational angle of the moving image indicating the direction in which the moving image is taken (portrait or landscape orientation).

The moving image acquiring unit 53 acquires moving image data to be used for generating a swing moving image, from the moving image storage unit 71.

The identification area setting unit 54 sets an identification area, on the basis of the identification area information stored in the analysis information storage unit 72, in a predetermined position (in the case of frontal shots, in the side position in the takeaway direction of the subject in his/her address posture, as shown in FIG. 2A) in the decoded image corresponding to each frame of the moving image data acquired by the moving image acquiring unit 53.

Further, the identification area setting unit 54 sets the identification area by changing the position and/or shape thereof, on the basis of the identification area information stored in the analysis information storage unit 72, in accordance with the BS scene setting and/or the left-handed setting, if any, and in accordance with the rotational angle of the moving image that was captured in portrait or landscape orientation.

The decoding unit 55 decodes the frames of the moving image data as the target of analysis, and outputs the decoded images.

Specifically, to calculate a threshold value, the decoding unit 55 decodes frames in a predetermined period (in the present embodiment, five frames) at the beginning of the moving image data as the analysis target (the photographed part in which the golf club or the like is not in the identification area as the person is not taking a swing), and outputs the decoded images.

Further, the decoding unit 55 identifies a time point corresponding to around the start position and a time point corresponding to around the impact position.

The decoding process is performed on all the frames except for the frames that were used for calculating the threshold value for judgment of noise in the identification area. The decoding is performed at each time of the identifying process.

The calculating unit 56 calculates, as an evaluation value, the sum of squared differences of the pixel values between the identification areas in the adjacent decoded image data items.

Specifically, the calculating unit 56 calculates a representative value (for example, average value, median value, etc.) of the sums of squared differences of the luminance values between the identification areas in the adjacent decoded image data items for a predetermined period (in the present embodiment, for five frames).

The representative value thus calculated is used as a threshold value for judgment of noise in the identification area. The calculated threshold value is stored in the analysis information storage unit 72.

Further, the calculating unit 56 calculates an evaluation value by calculating the sum of squared differences of the pixel values between the identification areas in the adjacent decoded image data items (the decoded image data item that was lastly decoded and the decoded image data item that was decoded immediately before the lastly decoded image data item).

The identification area analyzing unit 57 compares the threshold value with the calculated evaluation value and, in the case where the evaluation value is the threshold value or more, integrates the evaluation value of the lastly decoded image and the evaluation value of the image decoded immediately before the lastly decoded image, to thereby calculate an integrated value.

The identification area analyzing unit 57 identifies and acquires candidates for the time point immediately after the start of the swing (hereinafter, referred to as the "first reference time point") and the time point immediately before the impact of the swing (hereinafter, referred to as the "second reference time point").

Specifically, the identification area analyzing unit 57 identifies two sections each satisfying the following: that the integrated value in the section from the time point when the evaluation value has become the threshold value or more to the time point immediately before it becomes less than the threshold value is a certain value or more; that the width of the section is within a predetermined range; and that the integrated value in the section is within a predetermined range.

Through this process, any section in which the evaluation value is low but has exceeded the threshold value for a short period of time, any section in which the evaluation value is high and has exceeded the threshold value for a short period of time (section of a short period with steep changes), and any section in which the evaluation value is low for a long period of time, as shown in FIG. 3, are excluded from the target for identification.

The identification area analyzing unit 57 then identifies a first reference time point and a second reference time point by judging whether the period between two time points belonging respectively to the identified two sections and having the highest evaluation values (hereinafter, referred to as "peak evaluation values") (or the period from the time point, in the section to which the first peak evaluation value belongs, at which the evaluation value has become a threshold value or more to the time point, in the section to which the second peak evaluation value belongs, immediately before the evaluation value becomes less than the threshold value) is within a predetermined period or not. Thereafter, the time points corresponding respectively to the two peak evaluation values that meet the conditions are stored as the candidates for the first and second reference time points, in the analysis information storage unit 72.

(That is, the candidates for the first and second reference time points are required to meet the following four conditions in the identification: 1) that the integrated value in each section is a certain value or more; 2) that the width of each section is within a predetermined range; 3) that the integrated value in each section falls within a predetermined range; and 4) that the interval between the time points corresponding to the peak evaluation values in the respective sections is within a predetermined period.)

At this time, in the case where the two peak evaluation values do not meet the conditions for candidates, then the time points corresponding respectively to the two peak evaluation values are not set as the candidates for the first and second reference time points.

That is, as a result of the process of identifying the candidates performed on the provisional integrated values ranked first and second, if they do not include two peak evaluation values that meet the conditions for candidates, then the process of identifying the candidates is performed on the integrated values in next order, i.e. those ranked third and fourth.

Further, in the present embodiment, buffering and sorting are performed to replace the candidates sequentially for each process. This means that the identification area analyzing unit 57 stores and updates the data of candidates sequentially, without holding data except the data related to the selection of candidates (integrated values, peak evaluation values, and time slots of sections).

The moving image generating unit 58 generates swing moving image data by adding margins of several frames each to respective ends of the frame image data between the first and second reference time points identified. (That is, at the end corresponding to the first reference time point, frames from the one several frames ahead of the first reference time point to the one immediately preceding the first reference time point are set to be the margin, and at the end corresponding to the second reference time point, frames from the one immediately following the second reference time point to the one several frames after the second reference time point are set to be the margin.)

As a result, the swing moving image data that includes the frame image data item at the time point of the start position through the frame image data item at the time point of the impact position is generated.

Figure 5:
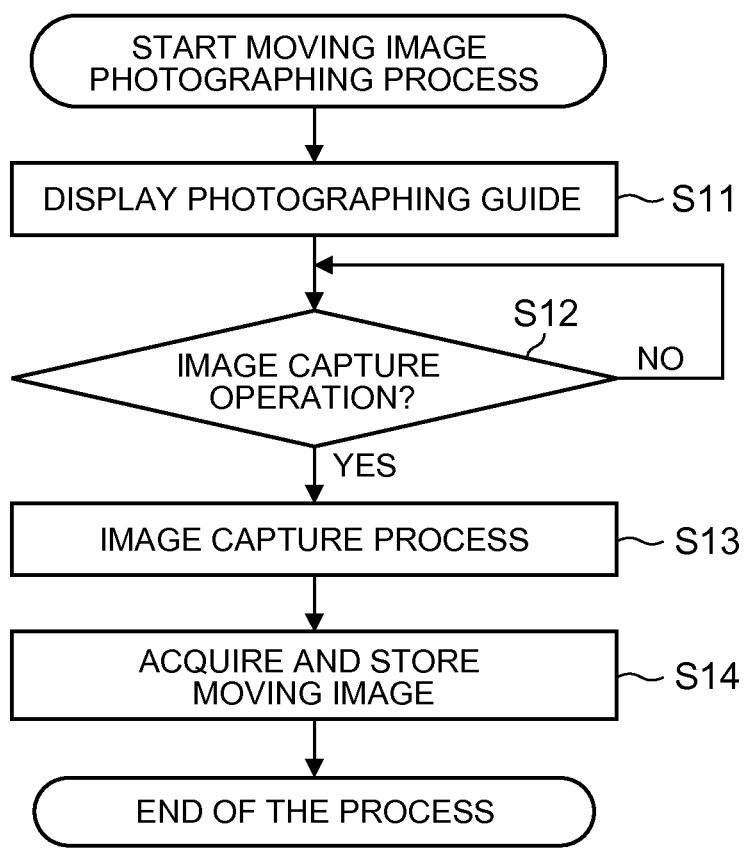
FIG. 5 is a flowchart illustrating the flow of the moving image photographing process executed by the image capture apparatus in FIG. 1 having the functional configuration in FIG. 4.

FIG. 5 is a flowchart illustrating the flow of a moving image photographing process carried out by the image capture apparatus 1 shown in FIG. 1 having the functional configuration shown in FIG. 4.

The moving image photographing process is started as a user inputs to the input unit 17 an operation of starting the moving image photographing process.

In step S11, the output control unit 51 controls the output unit 18 to display a live view image as well as the photographing guide(s) stored in the analysis information storage unit 72 on the live view image. As a result, the live view image is displayed on the output unit 18, and the photographing guides as shown in FIG. 2A or 2B are also displayed on the live view image.

The user determines the photographing position such that the subject being displayed on the live view image is overlaid on the human form as the photographing guide.

In step S12, the image capture control unit 52 judges whether an image capture operation has been input from the user to the input unit 17.

If there is no image capture operation, it is judged NO in step S12, and the process enters a standby mode.

If there is the image capture operation, it is judged YES in step S12, and the process proceeds to step S13.

In step S13, the image capture control unit 52 controls the image capture unit 16 to perform an image capture process.

As a result of the image capture process, frame image data items are output sequentially from the image capture unit 16, and the plurality of frame image data items output are compressed by a predetermined compression method to output a piece of moving image data.

In step S14, the moving image acquiring unit 53 acquires the moving image data output from the image capture unit 16. The acquired moving image data is stored in the moving image storage unit 71.

The moving image photographing process is then terminated.

Figure 6:
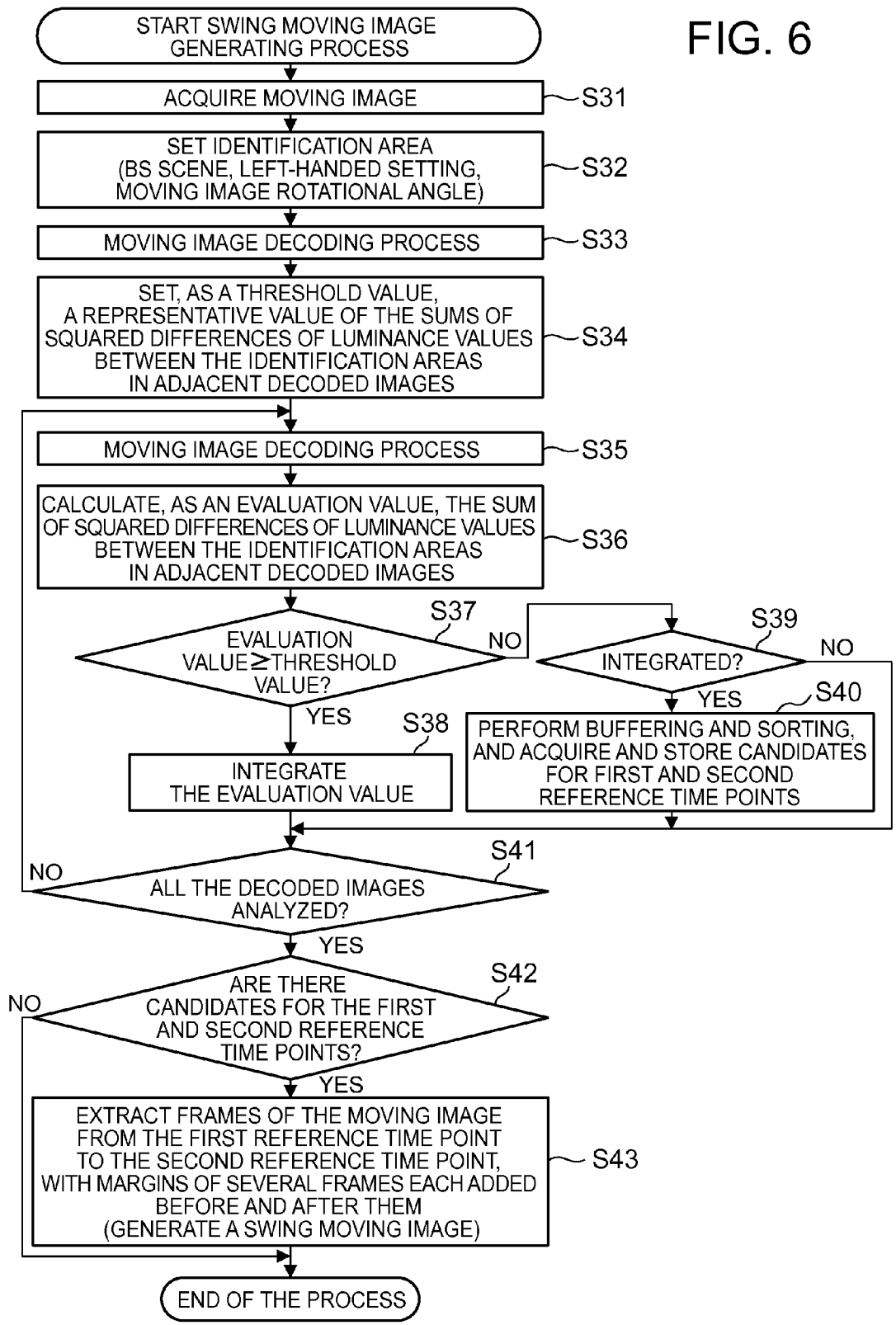
FIG. 6 is a flowchart illustrating the flow of the swing moving image generating process executed by the image capture apparatus in FIG. 1 having the functional configuration in FIG. 4.

FIG. 6 is a flowchart illustrating the flow of a swing moving image generating process carried out by the image capture apparatus 1 shown in FIG. 1 having the functional configuration shown in FIG. 4.

The swing moving image generating process is started as a user inputs to the input unit 17 an operation of starting the swing moving image generating process.

In step S31, the moving image acquiring unit 53 acquires, from the moving image storage unit 71, moving image data for use in generating swing moving image data.

In step S32, the identification area setting unit 54 sets an identification area in a predetermined position in the moving image acquired by the moving image acquiring unit 53, on the basis of the identification area information stored in the analysis information storage unit 72.

At this time, the identification area setting unit 54 sets the identification area by changing the position and/or shape thereof, on the basis of the identification area information stored in the analysis information storage unit 72, in accordance with the BS scene setting and/or the left-handed setting, if any, and in accordance with the rotational angle of the moving image data that was captured in portrait or landscape orientation.

In step S33, the decoding unit 55 carries out a moving image decoding process on the frames for a predetermined period of the moving image data as the analysis target for calculating a threshold value. Specifically, to calculate the threshold value taking account of the noise in the image in the identification area, the decoding unit 55 decodes the frame image data items in the predetermined period at the beginning of the moving image (the photographed part in which the golf club is not in the identification area as the person is not taking a swing), and outputs the decoded images.

In step S34, the calculating unit 56 calculates, as the threshold value, a representative value of the sums of squared differences of the luminance values between the identification areas in the adjacent decoded image data items for a predetermined period (in the present embodiment, for five frames).

Specifically, the representative value (for example, average value, median value, etc.) of the sums of squared differences between the identification areas in the adjacent decoded image data items for the predetermined period (in the present embodiment, for five frames) is calculated as the threshold value for the identification area.

The calculated threshold value is stored in the analysis information storage unit 72.

In step S35, the decoding unit 55 carries out the moving image decoding process on the frame image data items as the analysis target for identifying the first and second reference time points.

In step S36, the calculating unit 56 calculates, as an evaluation value, the sum of squared differences between the identification areas in the adjacent decoded image data items that have undergone the decoding process (i.e. the lastly decoded image data item and the decoded image data item that was decoded immediately before the lastly decoded image data item).

In step S37, the identification area analyzing unit 57 judges whether the evaluation value is equal to or larger than the threshold value stored in the analysis information storage unit 72.

If the evaluation value is smaller than the threshold value, it is judged NO in step S37, and the process proceeds to step S39. The processing in step S39 and on will be described later.

If the evaluation value is equal to or larger than the threshold value, it is determined YES in step S37, and the process proceeds to step S38.

In step S38, the calculating unit 56 integrates the evaluation values. Specifically, the calculating unit 56 calculates the sum of squared differences of the pixel values between the identification areas in the adjacent decoded image data items, thereby calculating the evaluation value.

Thereafter, the process proceeds to step S41. The processing in step S41 and on will be described later.

In step S39, the calculating unit 56 judges whether the evaluation values have been integrated.

If the evaluation values have not been integrated, it is judged NO in step S39, and the process proceeds to step S41.

If the evaluation values have been integrated, it is judged YES in step S39, and the process proceeds to step S40.

In step S40, the identification area analyzing unit 57 performs buffering and sorting processing, thereby identifying and acquiring the peak evaluation values corresponding to the candidates for the first and second reference time points.

When the conditions for the candidates are met, the peak evaluation values, the integrated values in which the peak evaluation values have been identified, and the time slots of the sections in which the peak evaluation values have been calculated, are stored in the analysis information storage unit 72.

For identifying the candidates for the frame image data items at the first and second reference time points, two sections in each of which the integrated value is a certain value or more, its width is within a predetermined range, and the integrated value is within a predetermined range, are identified.

The judgment is made as to whether the peak evaluation values belonging to the identified two sections are within a predetermined period, and the time points corresponding to the two peak evaluation values that meet the conditions for the candidates are stored into the analysis information storage unit 72 as the candidates for the first and second reference time points.

At this time, if the two peak evaluation values do not meet the conditions for the candidates, they are not regarded as the candidates for the first and second reference time points for use in extracting swing moving image data.

That is, as a result of the process of identifying the candidates performed on the provisional integrated values ranked first and second, if they do not include two peak evaluation values that meet the conditions for candidates, then the candidates identifying process is performed on the integrated values in next order, or, those ranked third and fourth.

If there already are candidates for the first and second reference time points, the process of identifying the candidates for the reference time points that meet the conditions is further performed.

Specifically, in the case where candidates for the first and second reference time points could not be found in step S40, the moving image decoding process is performed again from step S35. The information about the evaluation values except the points as the candidates for peaks is discarded, and the integrated value of the evaluation values between the newly decoded frames (between the newly decoded images) is stocked, and in step S40, the process of identifying the candidates for the first and second reference time points is newly performed.

Then, the process of temporarily storing and sequentially updating the information (peak evaluation values, integrated values, time slots of sections) for identifying the candidates for the first and second reference time points is performed sequentially by setting, as the candidates for the first and second reference time points, two time points which correspond to peak evaluation values that belong respectively to two sections in each of which the integrated value calculated therein is a certain value or more, its width is within a predetermined range, and the integrated value is within a predetermined range, and the interval between the peak evaluation values is within a predetermined period.

In step S41, the identification area analyzing unit 57 judges whether the analysis has been completed for all the decoded images.

If the analysis has not been completed for all the decoded images, it is judged NO in step S41, and the process returns to step S35.

If the analysis has been completed for all the decoded images, it is judged YES in step S41, and the process proceeds to step S42.

With the candidates determined by judging the conditions in step S40, in step S42, the identification area analyzing unit 57 judges whether there are candidates for the first and second reference time points.

If there are no candidates, it is judged NO in step S42, and the swing moving image generating process is terminated.

That is, the swing moving image is not generated, as the first and second reference time points cannot be identified with the absence of candidates.

If there are the candidates, it is judged YES in step S42, and the process proceeds to step S43.

In step S43, the moving image generating unit 58 generates swing moving image data by extracting, from the moving image data acquired by the moving image acquiring unit 53, frame image data items between the identified first and second reference time points, with margins of several frames each added to before the first reference time point and after the second reference time point. As a result, swing moving image data from the time point of start of the swing to the time point of impact is generated.

The swing moving image generating process is then terminated.

<Modification>

In the embodiment described above, for acquiring the candidates for the first and second reference time points, decoding and calculation of evaluation values were performed successively and buffering was performed. In the present example, sorting processing is performed on evaluation values for all the moving image data items calculated from all the decoded images.

In this case, it is configured such that, first, two integrated values having high peak evaluation values (integrated values to which the peak evaluation values ranked first and second belong) are regarded as targets for identification of candidates. If the integrated values to which the peak evaluation values ranked first and second belong do not meet the conditions for the candidates, two integrated values having the next highest peak evaluation values (integrated values to which the peak evaluation values ranked third and fourth belong) are regarded as targets for identification of candidates.

This modification has been configured such that, when the integrated values to which the peak evaluation values ranked first and second belong do not meet the conditions for candidates, then the integrated values to which the peak evaluation values ranked third and fourth belong are selected as the next targets for identification of candidates. Alternatively, it may be configured to lower the order one at a time, and the integrated values to which the peak evaluation values ranked second and third belong may be selected as the next targets for identification of candidates. Still alternatively, an integrated value to which one peak evaluation value belongs may be selected, and all other integrated values may be regarded as the targets for identification of candidates. In this case, if the target in highest order does not meet the conditions, then the target in next highest order may be selected to perform identification of the candidates.

The image capture apparatus 1 configured as described above includes the moving image acquiring unit 53, the calculating unit 56, and the identification area analyzing unit 57.

The moving image acquiring unit 53 acquires a plurality of images captured consecutively.

The calculating unit 56 calculates variation values of pixel values along a time series of the plurality of images acquired by the moving image acquiring unit 53, within a predetermined region common to the plurality of images.

The identification area analyzing unit 57 identifies two time points according to a predetermined standard from among a plurality of time points in the time series, on the basis of the variation values of the pixel values calculated by the calculating unit 56.

Accordingly, in the image capture apparatus 1, desired time points can be identified without using any special device.

The identification area analyzing unit 57 identifies, as the plurality of time points, a plurality of sections in which the variation values of the pixel values along the time series become a predetermined threshold value or more, on the basis of the variation values of the pixel values calculated by the calculating unit 56.

The calculating unit 56 calculates an evaluation value for each of the plurality of sections identified by the identification area analyzing unit 57.

The identification area analyzing unit 57 selects two sections from among the plurality of sections, on the basis of the evaluation value of each of the plurality of sections calculated by the calculating unit 56.

Further, the identification area analyzing unit 57 identifies two time points corresponding respectively to the two sections selected by the identification area analyzing unit 57.

Accordingly, in the image capture apparatus 1, desired time points can be identified, only by analyzing the images, without using any special device.

The identification area analyzing unit 57 selects two sections having higher evaluation values in order of values of evaluation, out of the plurality of sections.

Accordingly, in the image capture apparatus 1, desired time points can be identified with high precision.

The identification area analyzing unit 57 selects two sections having the evaluation values ranked first and second among the evaluation values of the plurality of sections.

Accordingly, in the image capture apparatus 1, desired time points can be identified with higher precision.

The identification area analyzing unit 57 judges whether a length between two time points corresponding respectively to the two sections falls within a predetermined range, and, in the case where the length falls within the predetermined range, the unit selects a plurality of images between the two time points.

Accordingly, in the image capture apparatus 1, desired time points can be identified with higher precision.

Further, the calculating unit 56 calculates, as the predetermined threshold value, an evaluation value of the pixel values within a predetermined region in a partial section among the plurality of images captured consecutively.

Accordingly, in the image capture apparatus 1, desired time points can be identified with higher precision.

It should be noted that the present invention is not limited to the above-described embodiment. Modifications and improvements within the range capable of achieving the objects of the present invention are included in the present invention.

In the above embodiment, in the process of identifying a candidate for the time point corresponding to the start or impact position, the highest evaluation value among the evaluation values constituting an integrated value was set as a peak evaluation value and subjected to judgement and, if it failed to meet the conditions, the process of identifying the candidate for the time point corresponding to the start or impact position was performed on the next integrated value. Alternatively, when the peak evaluation value corresponding to the highest evaluation value fails to meet the conditions, the identifying process may be performed again using the next highest evaluation value as the peak evaluation value.

Further, in the above embodiment, all the decoded images were analyzed to identify the start and impact positions. Alternatively, it may be configured such that, when there are peaks that meet the conditions, the process of identifying the start and impact positions is terminated and a swing moving image is generated.

In the above embodiment, it was configured to generate a swing moving image from the start position to the impact position. Alternatively, a swing moving image for a predetermined section, such as a swing moving image from the start position to the finish position or a swing moving image around the impact position, for example, may be generated by taking into account the time of motions expected from the identified positions (start position, impact position).

Further, in the above embodiment, a swing moving image was generated using a moving image photographed with the help of a photographing guide. Alternatively, a swing moving image may be generated using a moving image photographed from the front or from the rear so as to include an identification area.

In the above embodiment, the case of identifying a golf swing motion was described. The present invention, however, is applicable to a predetermined motion in which an object passes a specific region.

The present invention functions particularly effectively for swing motions involving predetermined back-and-forth motions in sports, such as batting in baseball, kicking in soccer, and swinging of a bamboo sword in Kendo.

In the above embodiment, the image capture apparatus 1 to which the present invention is applied was described by giving a digital camera as an example. It however is not particularly limited to the digital camera.

For example, the present invention is applicable generally to electronic equipment having a swing moving image generating function. Specifically, the present invention is applicable, for example, to a lap-top personal computer, a printer, a television set, a video camera, a portable navigation device, a mobile phone, a smart phone, a portable game machine, etc.

The series of processing described above can be executed by hardware, or by software.

In other words, the functional configuration shown in FIG. 4 is merely illustrative, and the present invention is not particularly limited thereto. All that is needed is that the image capture apparatus 1 includes the functions that can execute the above-described series of processing as a whole; the functional block used for achieving those functions is not particularly limited to the example shown in FIG. 4.

Further, one functional block may be configured with hardware alone, with software alone, or with a combination thereof.

In the case where the series of processing is executed by software, a program constituting the software is installed from a network or a recording medium into a computer or the like.

The computer may be one embedded in dedicated hardware. Alternatively, it may be a computer, e.g. a general-purpose personal computer, which can execute various functions as various programs are installed therein.

The recording medium containing such a program may be configured with a removable medium 31, shown in FIG. 1, which is distributed separately from the apparatus body for providing the program to a user. Alternatively, it may be configured with a recording medium which is provided to a user in the state of being built in the apparatus body in advance.

The removable medium 31 is composed of, for example, a magnetic disk (including a flexible disk), an optical disk, or a magneto-optical disk. The optical disk may be, for example, a compact disk-read only memory (CD-ROM), a digital versatile disk (DVD), a Blu-ray (registered trademark) Disc, etc.

The magneto-optical disk may be a mini-disk (MD), for example. The recording medium provided to the user in the state of being built in the apparatus body in advance may include, for example, the ROM 12 in FIG. 1 and the hard disk included in the storage unit 19 in FIG. 1, with programs recorded therein.

In the present specification, the steps describing the program recorded in the recording medium are not limited to the processing executed in a time series according to their order. The steps do not necessarily have to be executed in the time series; they may be executed in parallel or individually.

While several embodiments of the present invention have been described above, the embodiments are merely illustrative and are not intended to limit the technical scope of the present invention.

The present invention can be embodied in a variety of other forms. Further, various modifications such as omission and replacement are possible without departing from the spirit of the present invention.

Such embodiments and modifications are included in the scope and spirit of the invention described in the present specification, and also included in the scope of the accompanying claims and their equivalents.

DESCRIPTION OF REFERENCE SIGNS

1: image capture apparatus; 11: CPU; 12: ROM; 13: RAM; 14: bus; 15: input/output interface; 16: image capture unit; 17: input unit; 18: output unit; 19: storage unit; 20: communication unit; 21: drive; 31: removable medium; 51: output control unit; 52: image capture control unit; 53: moving image acquiring unit; 54: identification area setting unit; 55: decoding unit; 56: calculating unit; 57: identification area analyzing unit; 58: moving image generating unit; 71: moving image storage unit; and 72: analysis information storage unit.

What is claimed is:

1. An image processing apparatus comprising a processor, wherein the processor is configured to:
acquire a plurality of images captured consecutively;
calculate variation values of pixel values along a time series of the plurality of images acquired, in a first image area common to the plurality of images;
calculate, as a threshold value specific to the acquired plurality of images, a representative value of variation values of pixel values within the first image area, in a partial section of the time series of the plurality of images;
identify, in the time series of the plurality of images, two sections in which the variation values of the pixel values along the time series become the threshold value or more, based on the calculated variation values of the pixel values; and
generate, from the acquired plurality of images, moving image data including the two identified sections,
wherein the partial section of the time series of the plurality of images in which the processor calculates the threshold value is in a predetermined part of the time series outside of a part of the time series which includes the identified two sections, and the processor calculates the threshold value in the partial section of the time series after having acquired the plurality of images and before identifying said two sections.

2. The image processing apparatus according to claim 1, wherein the first image area is a predetermined region at a position common to the plurality of images.

3. The image processing apparatus according to claim 1, wherein the processor is further configured to:
identify, as a plurality of time points in the time series of the plurality of images, a plurality of sections in which the variation values of the pixel values along the time series become the threshold value or more, based on the calculated variation values of the pixel values;
calculate a representative value for each of the plurality of sections identified;
select the two sections from among the plurality of sections, based on the calculated representative value of each of the plurality of sections; and
identify, according to a predetermined standard, two time points corresponding respectively to the two sections selected.

4. The image processing apparatus according to claim 3, wherein the processor calculates the representative value of each of the plurality of sections in which the variation values of the pixel values become the threshold value or more, based on an integrated value of the variation values of the pixel values within that section.

5. The image processing apparatus according to claim 3, wherein the processor selects, as the two sections, two sections out of the plurality of sections having the representative values higher in a predetermined order.

6. The image processing apparatus according to claim 3, wherein the processor selects, as the two sections, two sections having the representative values ranked first and second among the representative values of the plurality of sections.

7. The image processing apparatus according to claim 3, wherein the processor is further configured to judge whether a length between two time points corresponding respectively to the two sections falls within a predetermined range, and, in a case in which the length falls within the predetermined range, the processor selects a plurality of images between the two time points.

8. The image processing apparatus according to claim 7, wherein the processor is configured to generate a new moving image comprising the selected plurality of images between the two time points.

9. The image processing apparatus according to claim 3, wherein the processor is further configured to judge whether a length between two time points corresponding respectively to the two sections falls within a predetermined range, and, in a case in which the length falls within the predetermined range, the processor selects a plurality of images between two images corresponding respectively to the two time points.

10. The image processing apparatus according to claim 1, wherein the plurality of images are obtained by capturing a motion of a subject consecutively, and the processor calculates the variation values of pixel values caused by the motion of the subject in the plurality of images, within the first image area in the partial section of the time series of the plurality of images, and calculates the representative value as the threshold value based on the calculated variation values.

11. The image processing apparatus according to claim 1, wherein the processor is configured to:
set the first image area common to each of the plurality of images acquired; and
calculate the variation values of the first image area which has been set in each of the plurality of images.

12. The image processing apparatus according to claim 11, wherein the processor is configured to set the first image area between around a swing start position to around an impact position.

13. The image processing apparatus according to claim 1, wherein the first image area is smaller than a whole area of each image of the plurality of images.

14. The image processing apparatus according to claim 1, wherein the processor is further configured to:
identify, as a plurality of time points in the time series of the plurality of images, a plurality of sections in which the variation values of the pixel values along the time series become the threshold value or more, based on the calculated variation values of the pixel values; and
identify, according to a predetermined standard, two time points from among the plurality of time points in the time series, which correspond, respectively, to the identified two sections which are included among the plurality of sections identified.

15. An image processing method comprising:
acquiring a plurality of images captured consecutively;
calculating variation values of pixel values along a time series of the plurality of images acquired, in a first image area common to the plurality of images;
calculating, as a threshold value specific to the acquired plurality of images, a representative value of variation values of pixel values within the first image area, in a partial section of the time series of the plurality of images;
identifying, in the time series of the plurality of images, two sections in which the variation values of the pixel values along the time series become the threshold value or more, based on the calculated variation values of the pixel values; and
generating, from the acquired plurality of images, moving image data including the two identified sections,
wherein the partial section of the time series of the plurality of images in which the threshold value is calculated is in a predetermined part of the time series outside of a part of the time series which includes the identified two sections, and the threshold value is calculated in the partial section of the time series after said acquiring of the plurality of images and before said identifying of said two sections.

16. The image processing method according to claim 15, wherein the first image area is a predetermined region at a position common to the plurality of images.

17. The image processing method according to claim 15, further comprising:
identifying, as a plurality of time points in the time series of the plurality of images, a plurality of sections in which the variation values of the pixel values along the time series become the threshold value or more, based on the calculated variation values of the pixel values;
calculating a representative value for each of the plurality of sections identified; and
selecting the two sections from among the plurality of sections, based on the representative value of each of the plurality of sections; and
identifying, according to a predetermined standard, two time points corresponding respectively to the two sections selected.

18. A non-transitory recording medium having a computer-readable program recorded therein, the program being executable by a computer to cause the computer to carry out functions comprising:
acquiring a plurality of images captured consecutively;
calculating variation values of pixel values along a time series of the plurality of images acquired, in a first image area common to the plurality of images;
calculating, as a threshold value specific to the acquired plurality of images, a representative value of variation values of pixel values within the first image area, in a partial section of the time series of the plurality of images;
identifying, in the time series of the plurality of images, two sections in which the variation values of the pixel values along the time series become the threshold value or more, based on the calculated variation values of the pixel values; and
generating, from the acquired plurality of images, moving image data including the two identified sections,
wherein the partial section of the time series of the plurality of images in which the threshold value is calculated is in a predetermined part of the time series outside of a part of the time series which includes the identified two sections, and the threshold value is calculated in the partial section of the time series after said acquiring of the plurality of images and before said identifying of said two sections.

19. The non-transitory recording medium according to claim 18, wherein the first image area is a predetermined region at a position common to the plurality of images.

20. The non-transitory recording medium according to claim 18, wherein the program causes the computer to carry out further functions comprising:
- identifying, as a plurality of time points, a plurality of sections in which the variation values of the pixel values along the time series become the threshold value or more, based on the calculated variation values of the pixel values;
- calculating a representative value for each of the plurality of sections identified;
- selecting the two sections from among the plurality of sections, based on the calculated representative value of each of the plurality of sections; and
- identifying, according to a predetermined standard, two time points corresponding respectively to the two sections selected.

* * * * *